United States Patent
Matsuura

(10) Patent No.: US 12,382,004 B2
(45) Date of Patent: Aug. 5, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takahiro Matsuura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 17/815,777

(22) Filed: Jul. 28, 2022

(65) Prior Publication Data
US 2023/0032948 A1  Feb. 2, 2023

(30) Foreign Application Priority Data
Jul. 30, 2021  (JP) .................................. 2021-125516

(51) Int. Cl.
| G06K 9/00 | (2022.01) |
| H04N 9/77 | (2006.01) |
| H04N 23/88 | (2023.01) |

(52) U.S. Cl.
CPC .............. *H04N 9/77* (2013.01); *H04N 23/88* (2023.01)

(58) Field of Classification Search
CPC .................. H04N 1/6027; H04N 1/62; G06T 2207/10024; G06T 5/94; G06T 5/92
See application file for complete search history.

(56) References Cited

U.S. PATENT DOCUMENTS

| 8,098,260 | B1* | 1/2012 | Shaick ..................... H04N 9/64 |
| | | | 345/589 |
| 2016/0065790 | A1* | 3/2016 | Matsunaga .......... G06K 15/102 |
| | | | 358/1.9 |
| 2016/0098971 | A1* | 4/2016 | Kawaguchi ............ H04N 1/628 |
| | | | 345/590 |
| 2016/0253981 | A1* | 9/2016 | Matsui ................. H04N 19/132 |
| | | | 345/690 |
| 2017/0324885 | A1* | 11/2017 | Ochiai ............... G06K 15/1878 |
| 2017/0359534 | A1* | 12/2017 | Li ........................... H04N 5/265 |
| 2018/0234591 | A1* | 8/2018 | Ochiai ................. H04N 1/6019 |
| 2018/0324327 | A1* | 11/2018 | Moribe ................ H04N 1/6019 |
| 2019/0098218 | A1* | 3/2019 | Sakai ..................... H04N 23/63 |
| 2019/0098292 | A1* | 3/2019 | Sakai ..................... H04N 9/646 |
| 2020/0279538 | A1* | 9/2020 | Lee .......................... G09G 5/02 |
| 2020/0351460 | A1* | 11/2020 | Cote ..................... H04N 23/80 |

FOREIGN PATENT DOCUMENTS

| JP | H10191076 A | 7/1998 |
| JP | 2004341923 A | 12/2004 |
| JP | 2017085227 A | 5/2017 |
| JP | 2018174596 A | 11/2018 |
| JP | 2019062482 A | 4/2019 |

\* cited by examiner

*Primary Examiner* — Hadi Akhavannik
(74) *Attorney, Agent, or Firm* — Canon U.S.A., Inc. IP Division

(57) ABSTRACT

An apparatus includes an acquisition unit configured to acquire a pair of first data and second data, the first data being obtained by imaging an object under a first environment, the second data being obtained by imaging the object under a second environment, and a processing unit configured to generate a three-dimensional lookup table by using the pair of the first data and the second data, the three-dimensional lookup table holding a condition for image processing to convert the first data into the second data.

18 Claims, 10 Drawing Sheets

FIG.6

WHEN NUMBER OF GRIDS IS 17,
COLOR DIFFERENCE IS 2.2.

INFORMATION PROCESSING APPARATUS, INFORMATION PROCESSING METHOD, AND STORAGE MEDIUM

BACKGROUND

Technical Field

The aspect of the embodiments relates to an information processing technique to perform color design of an imaging apparatus.

Description of the Related Art

Color processing parameters used for color processing that is performed by an imaging apparatus such as a digital camera are designed such that, for example, pixel values when a color chart is imaged become values of original colors of the color chart. The imaging apparatus often holds the color processing parameters as a three-dimensional lookup table (3DLUT).

Japanese Patent Application Laid-Open No. 2004-341923 discusses a technique to determine color processing parameters that enable adjustment of colors of an image obtained by imaging, by a digital camera, a color chart including a skin color, a sky color, a grass color, primary colors, and the like, to original colors of the color chart or colors preferred by a user.

Japanese Patent Application Laid-Open No. 2018-174596 discusses a technique to extract representative colors from one of actually-captured images captured under two types of light sources, and to adjust colors of the other image based on the representative colors.

In a case of the technique discussed in Japanese Patent Application Laid-Open No. 2004-341923, however, colors in a color gamut of the color chart can be reproduced with high accuracy, but colors out of the color gamut of the color chart cannot be reproduced (adjusted) in some cases.

In a case of the technique discussed in Japanese Patent Application Laid-Open No. 2018-174596, some characteristic representative colors are extracted from two types of actually-captured images, and the actually-captured images are converted by generating and applying a three×three matrix of light source conversion parameters. Accordingly, the conversion is limited in a light source condition. The technique discussed in Japanese Patent Application Laid-Open No. 2018-174596 is based on the premise that an object is limited. For this reason, the colors to be reproduced (adjusted) with high accuracy are limited to the representative colors.

SUMMARY

According to an aspect of the embodiments, an apparatus includes an acquisition unit configured to acquire a pair of first data and second data, the first data being obtained by imaging an object under a first environment, the second data being obtained by imaging the object under a second environment, and a processing unit configured to generate a three-dimensional lookup table by using the pair of the first data and the second data, the three-dimensional lookup table holding a condition for image processing to convert the first data into the second data.

Further features of the disclosure will become apparent from the following description of exemplary embodiments with reference to the attached drawings.

BRIEF DESCRIPTION OF THE DRAWINGS

FIG. 6 is a diagram illustrating a notification example of an accuracy calculation result.

DESCRIPTION OF THE EMBODIMENTS

Figure 1:
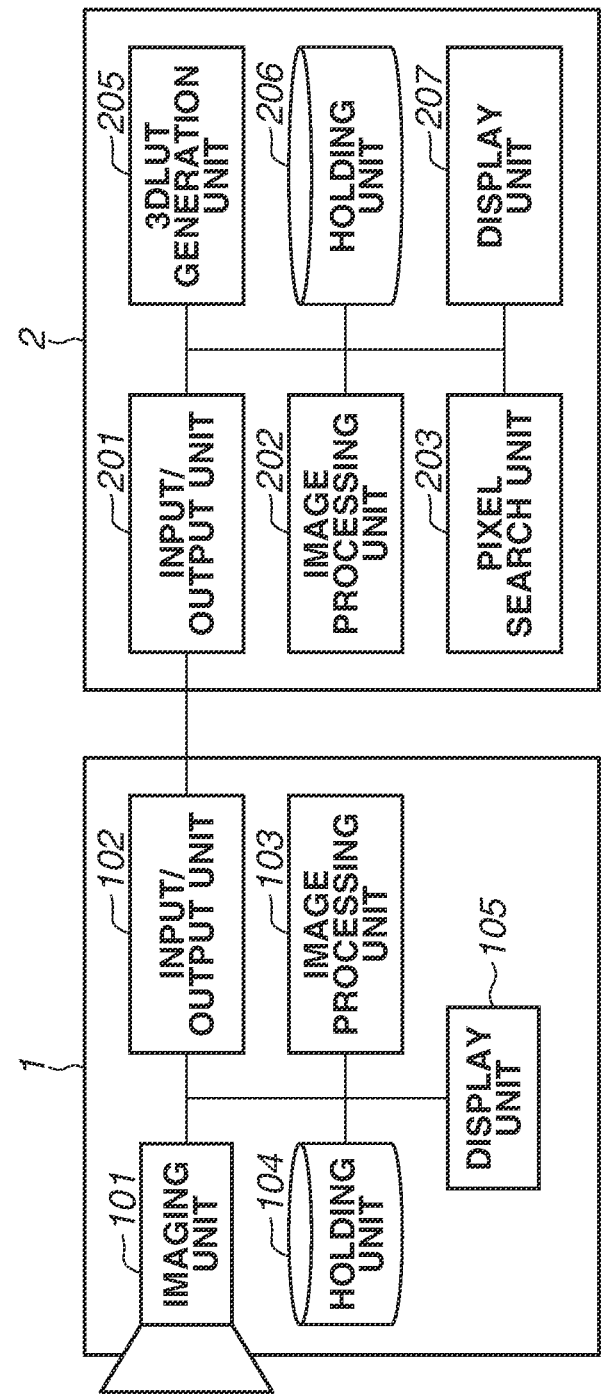
FIG. 1 is a diagram illustrating a system configuration example to which an information processing apparatus according to an exemplary embodiment is applied.

Some exemplary embodiments of the disclosure are described in detail with reference to drawings. The following exemplary embodiments do not limit the disclosure, and all of combinations of characteristics described in the exemplary embodiments are not necessarily essential for solving means of the disclosure. Configurations of the exemplary embodiments can be appropriately corrected or modified depending on a specification and various kinds of conditions (use condition, use environment, etc.) of an apparatus to which the disclosure is applied.

Parts of the exemplary embodiments described below may be appropriately combined. In each of the following exemplary embodiments, the same components are described while being denoted by the same reference numerals.

A first exemplary embodiment is described. FIG. 1 is a block diagram illustrating a configuration example of a system to which an information processing apparatus 2 according to the present exemplary embodiment is applied. The system illustrated in FIG. 1 includes a digital camera 1 that is an example of an imaging apparatus, and the information processing apparatus 2.

The digital camera 1 includes, as main components, an imaging unit 101, an input/output unit 102, an image processing unit 103, a holding unit 104, and a display unit 105.

The imaging unit 101 includes an imaging lens, an image sensor such as a charge coupled device (CCD), and a peripheral circuit.

The holding unit 104 holds image data captured by the imaging unit 101, image data processed by the image processing unit 103, data on a plurality of image processing parameters corresponding to a plurality of imaging modes, and the like. In the present exemplary embodiment, the plurality of image processing parameters includes a plurality of color processing parameters. The color processing parameters are organized into a three-dimensional lookup table (3DLUT), and the 3DLUT is held by the holding unit 104.

In one embodiment, the 3DLUT is prepared for each of the imaging modes, and holds the color processing parameters enabling acquisition of an image having color tones of an object assumed as an imaging target in each of the imaging modes. More specifically, at each of grid points of the 3DLUT, output values corresponding to independent input values of three primary colors R, G, and B are defined. As the image processing parameters in the holding unit 104, in addition to predetermined parameters set at the time of shipment of the digital camera 1, for example, parameters optionally adjusted by a user and parameters newly downloaded are settable. The imaging modes of the digital camera 1 include an imaging mode in which image data captured by the imaging unit 101 is output as it is. In this case, the image processing parameters are parameters causing the image data captured by the imaging unit 101 to be output as it is.

The image processing unit 103 performs image processing on the image data captured by the imaging unit 101.

For example, in a case where the user selects an imaging mode before imaging, the image processing unit 103 acquires, from the holding unit 104, the color processing parameters of the 3DLUT corresponding to the imaging mode, and performs image processing on the image data by using the color processing parameters of the 3DLUT. In a case where an imaging mode in which the image data captured by the imaging unit 101 is output or stored as it is is selected, the image processing unit 103 acquires, from the holding unit 104, the color processing parameters causing the captured image data to be output as it is. As a result, the image data captured by the imaging unit 101 is output or stored as it is without color processing being performed on the image data.

The display unit 105 includes a display device such as a liquid crystal display, and displays an image while or after imaging, an image based on image data on which image processing has been performed including color processing, various kinds of setting screens, and the like, on a screen of the display device.

The input/output unit 102 is an interface unit that can transmit/receive image data and data on the image processing parameters including the color processing parameters, to/from an external apparatus. The image data that has been captured by the digital camera 1 and on which the image processing has been performed is output to the external apparatus through the input/output unit 102. Examples of the external apparatus connected to the input/output unit 102 include the information processing apparatus 2 described below, and a storage medium such as a memory card. The digital camera 1 and the information processing apparatus 2 may transmit/receive data through a cable, wireless communication, infrared communication, or the like, or may exchange data through a recording medium such as a memory card (not illustrated).

Operation of each of the units in a case where the digital camera 1 images an object or the like is briefly described. In the following description, color processing corresponding to the imaging mode is described as an example of the image processing performed by the digital camera 1.

When the user turns on a power switch (not illustrated), the imaging unit 101 starts operation to continuously capture images, namely, operation to acquire a moving image displayed as a view-finder image on the screen of the display device of the display unit 105.

The image processing unit 103 performs image processing on image data continuously input from the imaging unit 101 by using the color processing parameters of the 3DLUT stored in the holding unit 104, and generates a display image from the image data on which the image processing has been performed. The display unit 105 displays the display image continuously transmitted from the image processing unit 103, as the view-finder image on the screen of the display device.

When the user determines a composition of the screen while observing the view-finder image, and depresses a shutter button (not illustrated), the image processing unit 103 performs color processing using the 3DLUT stored in the holding unit 104, on an image captured by the imaging unit 101 at a timing when the shutter button is depressed. In other words, at this time, the image processing unit 103 performs the image processing using the color processing parameters of the 3DLUT corresponding to the imaging mode. The image data on which the image processing has been performed is output to the external apparatus (such as information processing apparatus 2 and storage medium) through the input/output unit 102.

As described above, the digital camera 1 performs the color processing on the captured image by using the color processing parameters of the 3DLUT corresponding to the imaging mode. In a case where the imaging mode in which the captured image data is output as it is is set in the digital camera 1, the image data obtained by the imaging unit 101 and on which the image processing has not been performed such as the color processing is output from the input/output unit 102.

The information processing apparatus 2 according to the present exemplary embodiment is described.

The information processing apparatus 2 according to the present exemplary embodiment includes a function to generate the 3DLUT to be held by the digital camera 1, and a function to set (upload) data on the 3DLUT to the digital camera 1. The information processing apparatus 2 also includes a function to correct a predetermined 3DLUT in the digital camera 1 or to correct one or some of the color processing parameters of the 3DLUT, in addition to the function to set the newly-generated 3DLUT to the digital camera 1. In the present exemplary embodiment, processing including the processing to newly generate the 3DLUT and the processing to correct the predetermined 3DLUT is collectively referred to as 3DLUT generation (or 3DLUT design).

The information processing apparatus 2 according to the present exemplary embodiment includes an input/output unit 201, an image processing unit 202, a pixel search unit 203, a 3DLUT generation unit 205, a holding unit 206, and a display unit 207. In the present exemplary embodiment, a personal computer is assumed as the information processing apparatus 2. The information processing apparatus 2, however, is not limited to the personal computer.

The input/output unit 201 is an interface unit to transmit/receive image data, data on the 3DLUT, and the like, to/from an external apparatus. In the present exemplary embodiment, the digital camera 1 is assumed as the external apparatus. The external apparatus may be any other digital camera, any other information processing apparatus, or a storage medium such as a memory card. The input/output unit 201 and the external apparatus may transmit/receive data through a cable, wireless communication, infrared communication, or the like, or may exchange data through a recording medium such as a memory card (not illustrated).

The holding unit 206 holds image processing parameters to be used when the image processing unit 202 performs image processing. The image processing parameters held by the holding unit 206 include color processing parameters organized into a 3DLUT. The holding unit 206 can also store a plurality of pieces of image data acquired through the input/output unit 201. The holding unit 206 also has a function as a work memory to be used for the image processing and the like.

The image processing unit 202 can perform image processing using the image processing parameters held by the holding unit 206 on image data input through the input/output unit 201 and the image data stored in the holding unit 206. In the present exemplary embodiment, the image processing unit 202 can perform color processing on the image data by using the color processing parameters of the 3DLUT stored in the holding unit 206. The image processing unit 202 according to the present exemplary embodiment can perform, for example, color conversion processing to convert RGB values of each pixel of the image into uniform color space values. The details of the processing performed by the image processing unit 202 according to the present exemplary embodiment are described below.

The pixel search unit 203 performs neighboring pixel search processing to search for neighboring pixels of an optional grid point of interest of the 3DLUT from pixels of the image. The details of the neighboring pixel search processing performed by the pixel search unit 203 according to the present exemplary embodiment are described below.

The 3DLUT generation unit 205 performs 3DLUT generation processing to generate the 3DLUT of the color processing parameters based on a result of the image processing by the image processing unit 202 and a result of the neighboring pixel search processing by the pixel search unit 203. As described above, the 3DLUT generation processing by the 3DLUT generation unit 205 includes not only the processing to newly generate the 3DLUT but also the processing to correct the predetermined 3DLUT. The details of the 3DLUT generation processing performed by the 3DLUT generation unit 205 according to the present exemplary embodiment are described below.

The display unit 207 includes a display device, and displays a graphical user interface (GUI) to be used when the user inputs various kinds of information, a notification image described below, and the like, on a screen of the display device.

Operation of the information processing apparatus 2 according to the present exemplary embodiment when the 3DLUT is generated is described with reference to FIG. 2 and subsequent drawings. When the 3DLUT is generated, first image data obtained by imaging an object by a first imaging apparatus under a first imaging environment is input to the input/output unit 201 of the information processing apparatus 2. The first imaging apparatus is an imaging apparatus in which the generated 3DLUT is to be set (uploaded), and is the digital camera 1 in the present exemplary embodiment. The first imaging environment is an imaging environment when the first imaging apparatus images the object.

In the present exemplary embodiment, the object imaged by the first imaging apparatus may be any object and the object is not limited to a color chart. In the present exemplary embodiment, the object is an object under a natural environment or an artificial environment. Accordingly, the first image data obtained by imaging by the first imaging apparatus is data on an actually-captured image obtained by imaging the object. The first image data may be one piece of image data. In the present exemplary embodiment, the first image data is a group of plurality of pieces of image data acquired by performing image processing based on the same image processing condition on image data obtained by imaging different objects by the first imaging apparatus under the same first imaging environment. In the present exemplary embodiment, the first image data is image data acquired by performing image processing based on an image processing condition of interest on the image data on the object under the first imaging environment. The image processing condition of interest corresponds to the color processing parameters of the 3DLUT corresponding to the imaging mode of interest. Accordingly, the image processing based on the image processing condition of interest is color processing using the color processing parameters of the 3DLUT.

Second image data obtained by imaging, under a second imaging environment, the same object as the object imaged under the first imaging condition is input to the input/output unit 201 of the information processing apparatus 2. The second image data is image data obtained so as to be paired with the first image data. An imaging apparatus imaging the same object under the second imaging environment is a second imaging apparatus different from the first imaging apparatus. Accordingly, the second image data is image data obtained by imaging, under the second imaging environment, the same object as the object imaged by the first imaging apparatus, by the second imaging apparatus different from the first imaging apparatus. The second imaging environment is an imaging environment when the second imaging apparatus images the same object. In the present exemplary embodiment, the second imaging environment is different from the first imaging environment. The second imaging environment may be the same as the first imaging environment. Since the second imaging apparatus images the same object as the object imaged by the first imaging apparatus, the second image data is also data on an actually-captured image obtained by imaging the object. The second image data may be one piece of image data. In a case where the first imaging apparatus images different objects and a group of a plurality of pieces of first image data is obtained, the second image data is also a group of a plurality of pieces of image data. In this case, each piece of the second image data included in the group of the second image data is image data paired with corresponding piece of first image data in the group of the first image data.

As described above, the first image data is image data after the image processing based on the image processing condition of interest is performed on the image data obtained by imaging the object under the first imaging environment. The second image data paired with the first image data is image data obtained by imaging the same object under the second imaging environment. Accordingly, the first image data and the second image data forming a pair are image data on the same object but are different in color tones.

The information processing apparatus 2 according to the present exemplary embodiment handles the first image data as data on an input image, and handles the second image data as data on a target image that is a target of the color tones. The information processing apparatus 2 generates a 3DLUT holding an image processing condition to convert the first image data into the second image data by using the first image data and the second image data. In other words, the information processing apparatus 2 generates the 3DLUT of the color processing parameters to convert the color tones of the image of the first image data into the color tones of the image of the second image data. More specifically, the information processing apparatus 2 generates the 3DLUT of the color processing parameters to cause the color tones of the image that has been captured by the first image processing and on which the color processing has been performed to be the color tones of the target image.

Although the details are described below, when the information processing apparatus 2 according to the present exemplary embodiment determines values corresponding to each of the grid points of the 3DLUT, the pixel search unit 203 performs search about whether four pixels of the first image data are located at the positions surrounding the grid point of interest. In a case where four pixels of the first image data are located at the positions surrounding the grid point of interest, the 3DLUT generation unit 205 determines an interpolation value corresponding to the grid point of interest by interpolation processing using values of the four pixels. In contrast, in a case where pixels of the first image data are not located at the positions surrounding the grid point of interest, the pixel search unit 203 searches for three neighboring pixels nearest to the grid point of interest. The 3DLUT generation unit 205 determines the interpolation value corresponding to the grid point of interest by interpolation processing using values of the three nearest-neighboring pixels.

Thereafter, the information processing apparatus 2 uploads the generated 3DLUT from the input/output unit 201 to the first imaging apparatus (digital camera 1).

Figure 2:
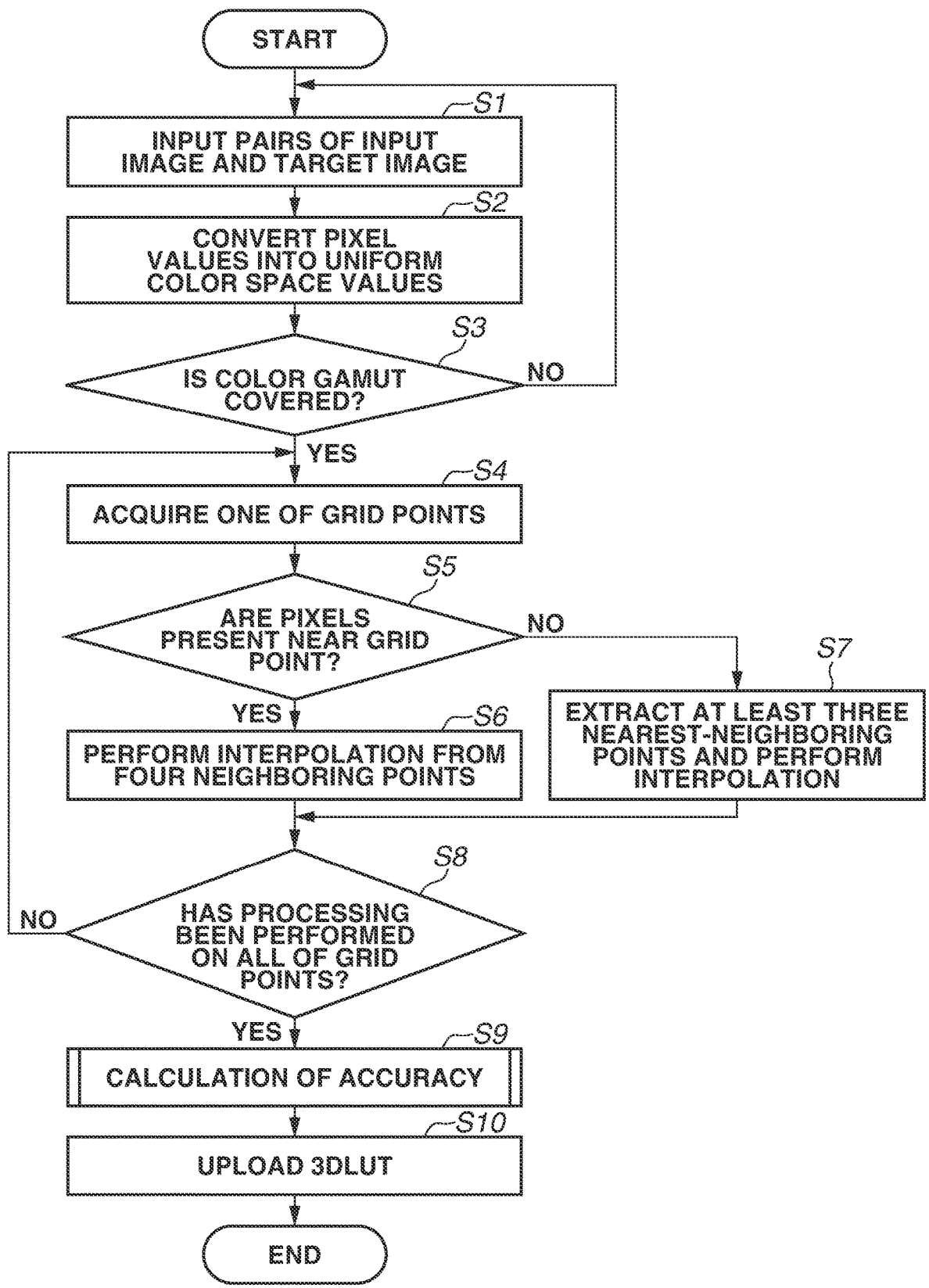
FIG. 2 is a flowchart of a three-dimensional lookup table (3DLUT) generation processing according to a first exemplary embodiment.

FIG. 2 is a flowchart illustrating a process of the 3DLUT generation processing by the information processing apparatus 2 according to the present exemplary embodiment. The following description is given while the image on the first image data is handled as the input image, and the image on the second image data is handled as the target image.

In step S1, the input/output unit 201 acquires at least one pair of the input image and the target image, and the holding unit 206 stores the pair of the input image and the target image. In the present exemplary embodiment, the number of pairs of the input image and the target image is at least one pair, but a plurality of pairs of the input image and the target image is acquired in consideration of a case where a color gamut is not covered in color gamut cover determination in step S3 described below. Accordingly, the plurality of pairs of the input image and the target image is stored in the holding unit 206. As described above, the input image is the image on the first image data that is acquired by performing the image processing based on the image processing condition of interest on the image data captured under the first imaging environment. The target image is the image on the second image data that is captured under the second imaging environment.

In step S2, the image processing unit 202 converts RGB values (CIERGB values) of each of pixels of one pair of the input image and the target image among the plurality of pairs acquired and stored in the holding unit 206 in step S1 into uniform color space values (CIELAB values). Expressions to convert the CIERGB values into the CIELAB values are described below.

In step S3, the image processing unit 202 maps the uniform color space values of the pixels of the input image converted in step S2 on a uniform color space and determines whether a predetermined color gamut is covered. The details of a method of determining whether the color gamut is covered are described below. In a case where the image processing unit 202 determines that the color gamut is not covered (NO in step S3), the processing returns to step S1, and the image processing unit 202 acquires another pair of the input image and the target image. In next step S2, the image processing unit 202 converts RGB values of each of pixels of these images into uniform color space values in a manner similar to the above. In contrast, in a case where the image processing unit 202 determines that the color gamut is covered (YES in step S3), the processing proceeds to step S4.

In step S4, the image processing unit 202 acquires one of the grid points of the 3DLUT. In a case where it is assumed that the number of grids of the 3DLUT is 17, the image processing unit 202 acquires RGB values (CIERGB values) corresponding to each of the grid points in order represented by the following expression (1) and converts the RGB values into uniform color space values (CIELAB values), $$(R,G,B)=(0,0,0)(0,0,64)(0,0,128)\ldots(0,0,1023)(0,64,0)(0,64,64)\ldots(0,64,1023)(0,128,0)(0,128,64)\ldots(1023,1023,1023). \quad (1)$$

In step S5, the pixel search unit 203 determines whether pixels (uniform color space values converted in step S2) of the input image are located near one grid point of interest of the 3DLUT acquired in step S4. In other words, the pixel search unit 203 determines whether the uniform color space values of four pixels of the input image are located at positions surrounding the uniform color space values corresponding to the grid point of interest. In a case where the pixel search unit 203 determines that the four pixels (uniform color space values) of the input image are located at the positions surrounding the grid point of interest (YES in step S5), the processing proceeds to step S6. In contrast, in a case where the pixel search unit 203 determines that the four pixels of the input image are not located (NO in step S5), the processing proceeds to step S7. The details of the determination processing by the pixel search unit 203 are described below.

Figure 3:
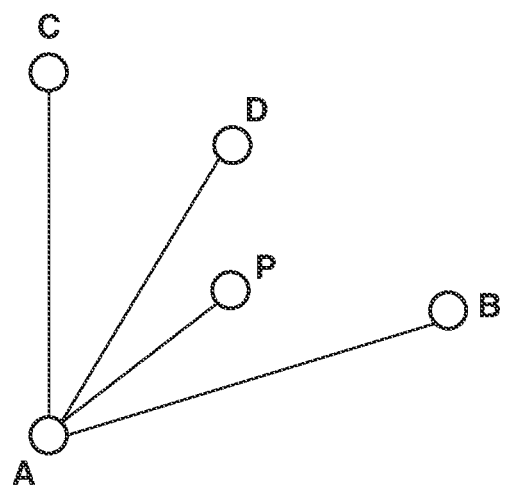
FIG. 3 is an explanatory diagram when an interpolation value corresponding to a point of interest is determined by interpolation from four neighboring points surrounding the point of interest.

In step S6, the 3DLUT generation unit 205 calculates interpolation values (uniform color space values) corresponding to the grid point of interest by interpolation processing using the uniform color space values of the four pixels found as the neighboring pixels of the grid point of interest in step S5. FIG. 3 is a diagram illustrating the grid point of interest before the interpolation processing as a point P (uniform color space values) and the uniform color space values of the four neighboring pixels surrounding the grid point of interest as points A, B, C, and D. The 3DLUT generation unit 205 handles one of the four points A, B, C, and D as a reference point (e.g., point A), and creates four vectors (ABv), (ACv), (ADv), and (APv) from the reference point A to the points B, C, and D, and the point P. The 3DLUT generation unit 205 determines optional coefficients k, l, and m satisfying the following expression (2). The coefficients k, l, and m indicate interpolation ratios, $$(APv)=k(ABv)+l(ACv)+m(ADv) \quad (2)$$

The 3DLUT generation unit 205 handles, among the uniform color space values (uniform color space values converted in step S2) of the pixels of the target image, four points corresponding to the points A, B, C, and D in the input image as points A', B', C', and D'. The 3DLUT generation unit 205 calculates values of a point P' after the interpolation processing from the following expression (3) by using four vectors (A'B'v), (A'C'v), (A'D'v), and (A'P'v) from the reference point A' to the points B', C', and D' and the point P', and the coefficients k, l, and m, $$(A'P'v)=k(A'B'v)+l(A'C'v)+m(A'D'v) \quad (3)$$

Figure 4:
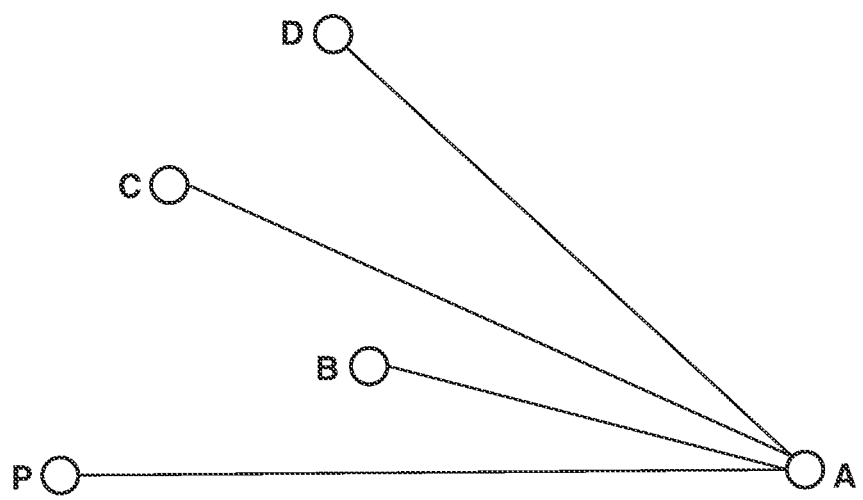
FIG. 4 is an explanatory diagram when the interpolation value corresponding to the point of interest is determined by interpolation from three neighboring points nearest to the point of interest.

On the other hand, in step S7, the pixel search unit 203 searches for three neighboring pixels (uniform color space values) nearest to the grid point of interest. The 3DLUT generation unit 205 calculates the values (uniform color space values) of the grid point of interest by interpolation processing based on the uniform color space values of the three neighboring pixels nearest to the grid point of interest. FIG. 4 is a diagram illustrating the grid point of interest before the interpolation processing as the point P (uniform color space values) and the uniform color space values of the three neighboring pixels nearest to the grid point of interest as points B, C, and D. The 3DLUT generation unit 205 handles, as a point A, an imaginary point at which brightness is equal to brightness of the point P before the interpolation processing and hue and saturation are both zero, and creates four vectors (ABv), (ACv), (ADv), and (APv) from the point A to the three nearest-neighboring points B, C, and D, and the point P. The 3DLUT generation unit 205 determines the optional coefficients k, 1, and m satisfying the above-described expression (2).

The 3DLUT generation unit 25 handles, among the uniform color space values of the pixels of the target image, four points corresponding to the imaginary point A and the three nearest-neighboring points B, C, and D as the points A', B', C', and D'. The 3DLUT generation unit 205 calculates values of the point P' after the interpolation processing from the above-described expression (3) by using four vectors (A'B'v), (A'C'v), (A'D'v), and (A'P'v) from the reference point A' to the points B', C', and D' and the point P', and the coefficients k, l, and m.

After step S6 described above or step S7, the processing proceeds to step S8. In step S8, the 3DLUT generation unit 205 determines whether the above-described calculation processing has been performed on all of the grid points of the 3DLUT. In a case where the calculation processing has not been performed on all of the grid points of the 3DLUT (NO in step S8), the processing returns to step S4, and the pixel search unit 203 acquires an unprocessed grid point. In contrast, in a case where it is determined that the calculation processing has been performed on all of the grid points of the 3DLUT (YES in step S8), the 3DLUT generation unit 205 converts the uniform color space values (CIELAB values) corresponding to each of the grid points after the calculation processing into the RGB values (CIERGB values), thereby generating the 3DLUT. Thereafter, the processing proceeds to step S9.

In step S9, the image processing unit 202 performs the color processing on the input image by using the 3DLUT generated by the 3DLUT generation unit 205, and compares the color-processed input image with the target image to calculate accuracy of the 3DLUT. The details of the 3DLUT accuracy calculation processing are described below. A result of the 3DLUT accuracy calculation processing is displayed as an evaluation value of the 3DLUT accuracy on, for example, the display unit 207. In the present exemplary embodiment, the image processing unit 202 calculates the 3DLUT accuracy, but the 3DLUT generation unit 205 may calculate the 3DLUT accuracy.

Whether the 3DLUT accuracy is sufficient may be determined by the user from a result of the 3DLUT accuracy calculation processing displayed on the display unit 207, or may be automatically determined based on comparison between the result of the 3DLUT accuracy calculation processing and a predetermined accuracy threshold. In a case where the 3DLUT accuracy is sufficient, the processing proceeds to step S10.

In contrast, in a case where the 3DLUT accuracy is insufficient, the processing in the flowchart of FIG. 2 ends. In the case where the 3DLUT accuracy is insufficient, the processing may be returned to step S1, for example, in response to an instruction from the user, and the 3DLUT generation processing may be performed again.

In step S10, the information processing apparatus 2 stores the generated 3DLUT in the holding unit 206, and uploads the generated 3DLUT to the digital camera 1 through the input/output unit 201. The uploaded 3DLUT is stored in the holding unit 104 of the digital camera 1. In a case where the digital camera 1 performs image processing by using the 3DLUT after the 3DLUT is uploaded, color reproduction of an optional input image can be adjusted to color reproduction of the target image.

The processing to convert the RGB values (CIERGB values) into the uniform color space values (CIELAB values) performed by the image processing unit 202 in step S2 is described. The image processing unit 202 performs the conversion processing to convert the CIERGB values into CIEXYZ values, and to convert the CIEXYZ values into the CIELAB values. Before the conversion, the RGB values are normalized (normalized through, for example, division by maximum value) so as to be settled in a range of $0 \leq R_{sRGB}$, $G_{sRGB}$, $B_{sRGB} \leq 1.0$.

Expressions to convert the CIERGB values into the CIEXYZ values are represented by the following expressions (4) to (7).

$R_{linear} = R_{sRGB}/12.92$ when $R_{sRGB} \leq 0.04045$ $R_{linear} = \{(R_{sRGB}+0.055)/1.055\}^{2.4}$ when $R_{sRGB} > 0.04045$ $G_{linear} = G_{sRGB}/12.92$ when $G_{sRGB} \leq 0.04045$ $G_{linear} = \{(G_{sRGB}+0.055)/1.055\}^{2.4}$ when $G_{sRGB} > 0.04045$ (4)

$B_{linear} = B_{sRGB}/12.92$ when $B_{sRGB} \leq 0.04045$ (5)

$B_{linear} = \{(B_{sRGB}+0.055)/1.055\}^{2.4}$ when $B_{sRGB} > 0.04045$ (6)

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{liner} \\ G_{liner} \\ B_{liner} \end{bmatrix}$$ (7)

Expressions to convert the CIEXYZ values into the CIELAB values are represented by the following expressions (8) to (12).

$X_{Rate} = (X/Xn)^{1/3}$ when $X/Xn > 0.00856$ $X_{Rate} = 7.787 \times (X/Xn) + 16.0/116.0$ when $X/Xn \leq 0.00856$ $Y_{Rate} = (Y/Yn)^{1/3}$ when $Y/Yn > 0.00856$ $Y_{Rate} = 7.787 \times (Y/Yn) + 16.0/116.0$ when $Y/Yn \leq 0.00856$ $Z_{Rate} = (Z/Zn)^{1/3}$ when $Z/Zn > 0.00856$ $Z_{Rate} = 7.787 \times (Z/Zn) + 16.0/116.0$ when $Z/Zn \leq 0.00856$ (8)

$L^* = 116.0 \times (Y/Yn)^{1/3} - 16.0$ when $Y/Yn > 0.00856$ (9)

$L^* = 903.29 \times (Y/Yn)$ when $Y/Yn \leq 0.00856$ (10)

$a^* = 500 \times (X_{Rate} - Y_{Rate})$ (11)

$b^* = 200 \times (Y_{Rate} - Z_{Rate})$ (12)

Values Xn, Yn, and Zn are calculated from color temperatures of illumination in imaging.

The processing to convert the uniform color space values (CIELAB values) of each of the grid points of the 3DLUT into the RGB values (CIERGB values) performed by the 3DLUT generation unit 205 in step S8 is described. The 3DLUT generation unit 205 performs the conversion processing to convert the CIELAB values into the CIEXYZ values, and to convert the CIEXYZ values into the CIERGB values.

Expressions to convert the CIELAB values into the CIEXYZ values are represented by the following expressions (13) to (18).

$$Y_{Rate}=(L^*+16.0)/116.0 \text{ when } L^*>7.99953624$$

$$Y_{Rate}=(L^*/903.29)^{1/3} \text{ when } L^*\leq 7.99953624$$

$$X_{Rate}=a^*/500.0+Y_{Rate}$$

$$Z_{Rate}=-b^*/200.0+Y_{Rate}$$

$$X=X_{Rate}^3 \text{ when } X_{Rate}^3>0.00856 \tag{13}$$

$$X=(X_{Rate}-16.0/116.0)/7.787 \text{ when } X_{Rate}^3\leq 0.00856 \tag{14}$$

$$Y=Y_{Rate}^3 \text{ when } Y_{Rate}^3>0.00856 \tag{15}$$

$$Y=(Y_{Rate}-16.0/116.0)/7.787 \text{ when } Y_{Rate}^3\leq 0.00856 \tag{16}$$

$$Z=Z_{Rate}^3 \text{ when } Z_{Rate}^3>0.00856 \tag{17}$$

$$Z=(Z_{Rate}-16.0/116.0)/7.787 \text{ when } Z_{Rate}^3\leq 0.00856 \tag{18}$$

Expressions to convert the CIEXYZ values into the CIERGB values are represented by the following expressions (19) to (22).

$$\begin{bmatrix} R_{liner} \\ G_{liner} \\ B_{liner} \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \begin{bmatrix} X \\ Y \\ Z \end{bmatrix} \tag{19}$$

$$R_{sRGB}=R_{linear}\times 12.92 \text{ when } R_{linear}\leq 0.0031808$$

$$R_{sRGB}=1.055\times R_{linear}^{1.0/2.4}-0.055 \text{ when } R_{linear}>0.0031808$$

$$G_{sRGB}=G_{linear}\times 12.92 \text{ when } G_{linear}\leq 0.0031808$$

$$G_{sRGB}=1.055\times G_{linear}^{1.0/2.4}-0.055 \text{ when } G_{linear}>0.0031808 \tag{20}$$

$$B_{sRGB}=B_{linear}\times 12.92 \text{ when } B_{linear}\leq 0.0031808 \tag{21}$$

$$B_{sRGB}=1.055\times B_{linear}^{1.0/2.4}-0.055 \text{ when } B_{linear}>0.0031808 \tag{22}$$

The processing to determine whether four pixels surrounding the grid point of interest are located is described.

In the determination, as described in the example of FIG. 3 described above, the four points A, B, C, and D near the point P as the grid point of interest are acquired from the points in which the RGB values are converted into the CIELAB values, of the pixels of the input image. The four vectors (ABv), (ACv), (ADv), and (APv) from the point A as a reference to the points B, C, and D, and the point P are created, and the optional coefficients k, l, and m satisfying the above-described expression (2) are determined. In a case where the following inequality (23) is satisfied, it is determined that the point P is surrounded by the points A, B, C, and D. The pixel search unit 203 searches for the four points until the four points satisfy the inequality (23). In a case where the four points satisfying the inequality (23) are not found, the pixel search unit 203 ends the search.

$$k+l+m\leq 1, 0\leq k, 0\leq l, 0\leq m \tag{23}$$

Figure 5:
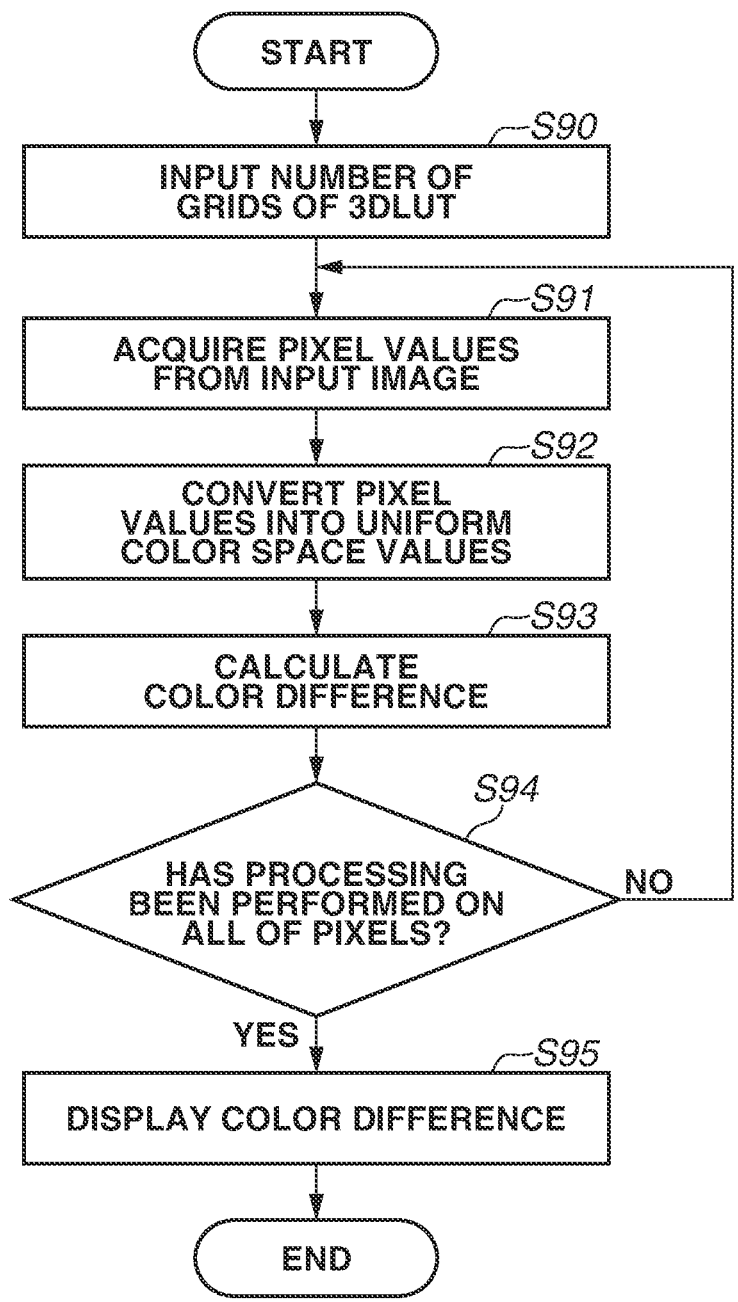
FIG. 5 is a flowchart of accuracy calculation processing.

The 3DLUT accuracy calculation processing performed by the image processing unit 202 in step S9 of FIG. 2 is described with reference to FIG. 5 and FIG. 6. An example in which a color difference is used as the evaluation value representing the accuracy is described. FIG. 5 is a flowchart illustrating a process of the accuracy calculation processing by the image processing unit 202, and FIG. 6 is a diagram illustrating a notification display example of an accuracy calculation result.

First, in step S90 in FIG. 5, the image processing unit 202 acquires the number of grids of the 3DLUT. In the present exemplary embodiment, the number of grids of the 3DLUT is 9, 17, or 33.

In step S91, the image processing unit 202 acquires the pixel values (CIERGB values) of the pixel of interest from the input image.

In step S92, the image processing unit 202 performs the 3DLUT conversion on the pixel of interest by using the 3DLUT generated by the 3DLUT generation unit 205, and converts the RGB values (CIERGB values) after the 3DLUT conversion into the uniform color space values (CIELAB values). At this time, the image processing unit 202 acquires the uniform color space values of a pixel corresponding to the pixel of interest in the input image from the uniform color space values (uniform color space values converted based on expressions (4) to (12)) of the pixels of the target image converted in step S2.

In step S93, the image processing unit 202 calculates the color difference based on an expression (24) by using uniform color space values $L^*_i a^*_i b^*_i$ of a pixel of interest i obtained in step S92 and uniform color space values $L^*_{Ti} a^*_{Ti} b^*_{Ti}$ of a pixel Ti of the target image corresponding to the pixel of interest i.

$$\Delta E=\sqrt{\{(L^*_{Ti}-L^*_i)^2+(a^*_{Ti}-a^*_i)^2-(b^*_{Ti}-b^*_i)^2\}} \tag{24}$$

The value E is an evaluation value corresponding to the pixel i.

In step S94, the image processing unit 202 determines whether the processing has been performed on all of the pixels of the input image. In a case where the processing has not been performed on all of the pixels of the input image (NO in step S94), the processing returns to step S91, and the processing is performed on an unprocessed pixel. In a case where the processing has been performed on all of the pixels of the input image (YES in step S94), the processing proceeds to step S95.

In step S95, the image processing unit 202 determines an average value of the color differences calculated for all of the pixels and displays the average value of the color differences as the evaluation value representing the 3DLUT accuracy on the display unit 207. FIG. 6 is a diagram illustrating a display example.

Figure 7:
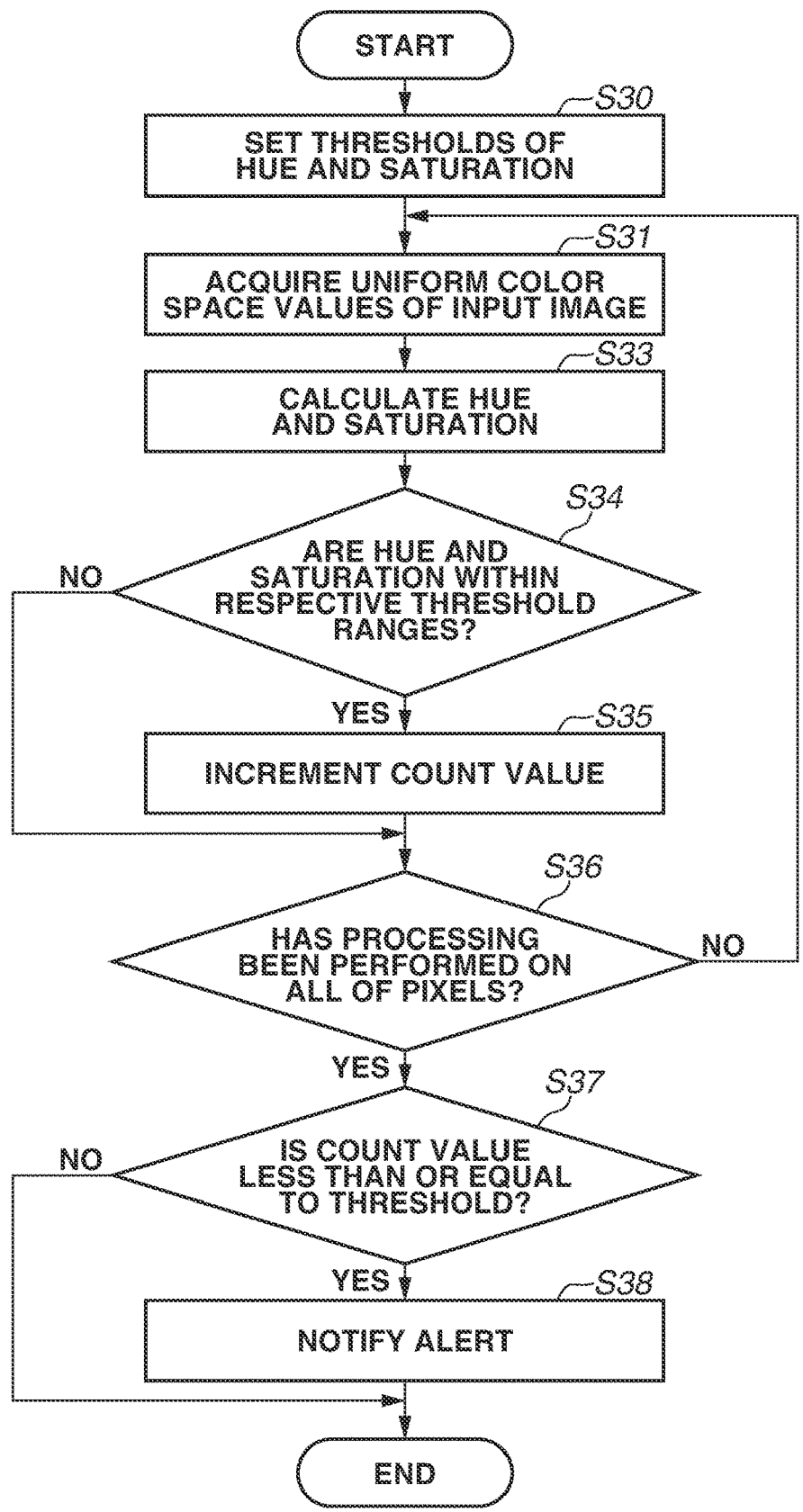
FIG. 7 is a flowchart of color gamut cover determination processing.
Figure 8:
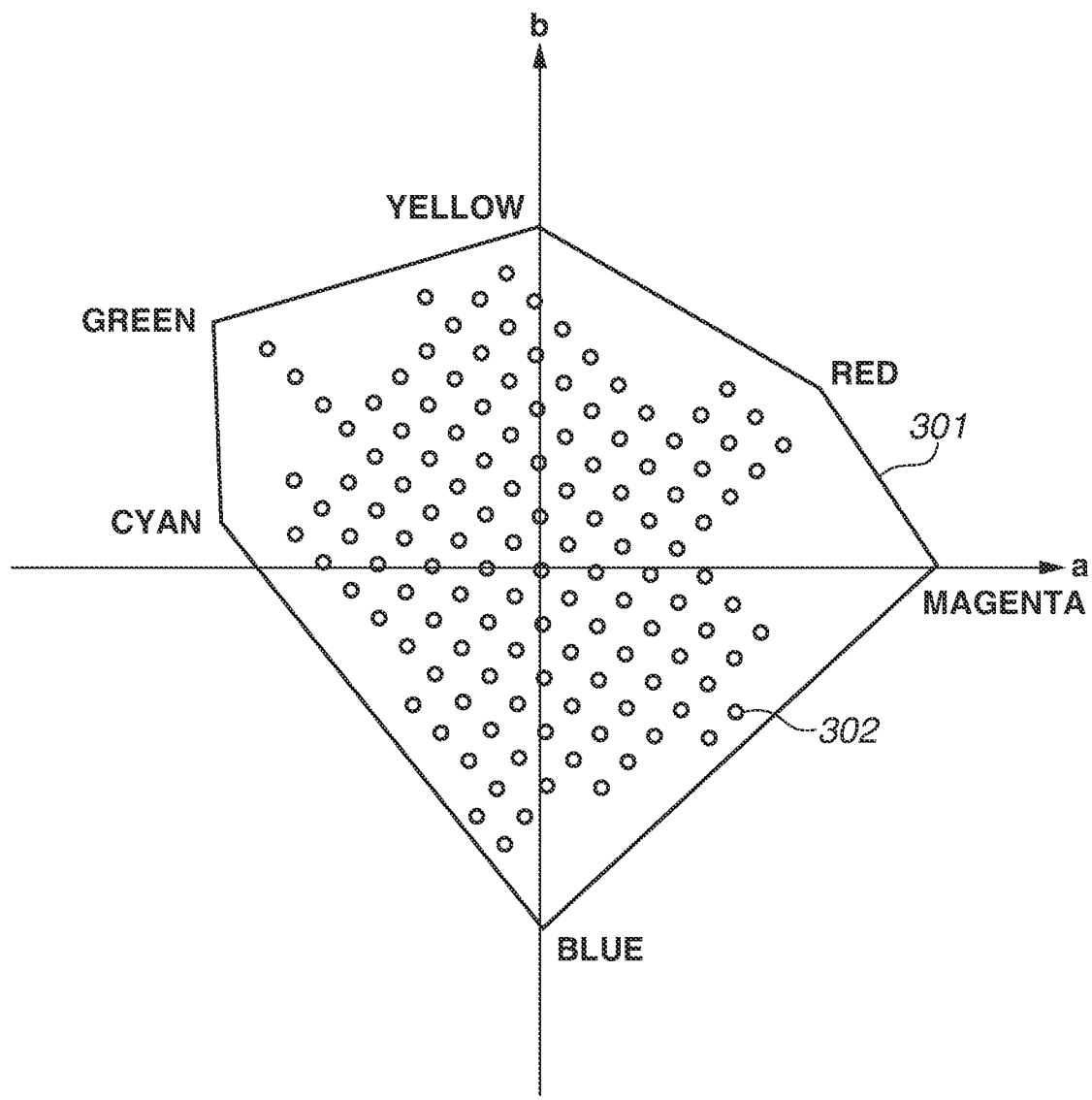
FIG. 8 is a diagram illustrating color distribution of an input image.
Figure 9:
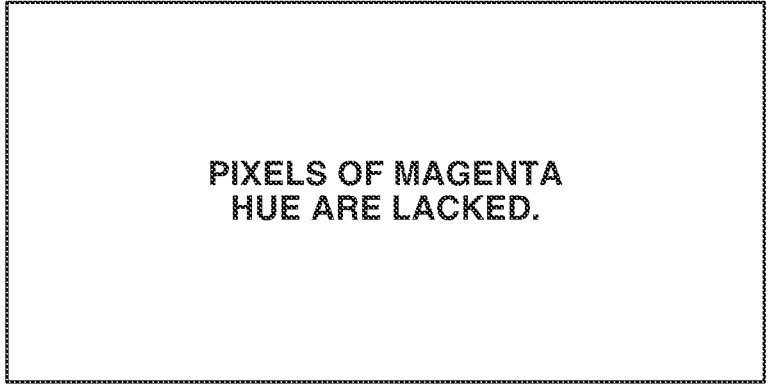
FIG. 9 is a diagram illustrating a notification example of a color gamut cover determination result.

The processing to determine whether the predetermined color gamut is covered, performed by the image processing unit 202 in step S3 in FIG. 2 is described with reference to FIG. 7 to FIG. 9. FIG. 7 is a flowchart illustrating a process of the color gamut cover determination processing by the image processing unit 202. FIG. 8 is a diagram illustrating distribution of uniform color space values 302 of the pixels of the input image in a uniform color space 301. FIG. 9 is a diagram illustrating a notification display example based on a result of the color gamut cover determination processing.

In step S30 in FIG. 7, the image processing unit 202 sets thresholds of hue and saturation to be used for determination. For example, as illustrated in FIG. 8, in a case where a high saturation area of magenta is used as the predetermined color gamut and it is determined whether the high saturation area of magenta is covered, it is determined that the color gamut is covered when the number of pixels in the color gamut of magenta is sufficient. To check the number of pixels in the high saturation area of magenta as described above, a threshold Hth of hue H and a threshold Cth of saturation C are set as the following expressions (25) and (26) in step S30.

$$-20 \leq Hth \leq 20 \quad (25)$$

$$30 \leq Cth \leq 200 \quad (26)$$

In step S31, the image processing unit 202 acquires the uniform color space values obtained by the conversion expressions (4) to (12) in step S2 described above, of one pixel of interest of the input image.

In step S33, the image processing unit 202 calculates the hue H and the saturation C by the following expressions (27) and (28) from the uniform color space values of the one pixel of the input image acquired in step S31.

$$H = a\tan(b/a) \quad (27)$$

$$C = \sqrt{(a^2 + b^2)} \quad (28)$$

In step S34, the image processing unit 202 determines whether the calculated hue H is within a range of the threshold Hth and the calculated saturation C is within a range of the threshold Cth. In a case where the calculated hue H and the calculated saturation C are within the respective ranges (YES instep S34), the processing proceeds to step S35. Otherwise (NO in step S34), the processing proceeds to step S36.

In step S35, the image processing unit 202 increments a count value of a counter that counts the number of pixels having the hue H within the range of the threshold Hth and the saturation C within the range of the threshold Cth. The processing then proceeds to step S36.

In step S36, the image processing unit 202 determines whether the processing has been performed on all of the pixels of the input image. In a case where the processing has not been performed on all of the pixels (NO in step S36), the processing returns to step S31, and the image processing unit 202 acquires uniform color space values of an unprocessed pixel. In contrast, in a case where it is determined that the processing has been performed on all of the pixels (YES in step S36), the processing proceeds to step S37.

In step S37, the image processing unit 202 determines whether the count value of the counter is less than or equal to a threshold. The threshold of the count value is a predetermined value enabling determination that the predetermined color gamut is not covered, but can be optionally changed by the user or the like. In other words, in the present exemplary embodiment, in a case where the count value is less than or equal to the threshold, it is determined that the color gamut is not covered. In a case where the count value exceeds the threshold value, it is determined that the color gamut is covered. In a case where the count value is less than or equal to the threshold (YES in step S37), the processing proceeds to step S38. In a case where the count value exceeds the threshold value (NO in step S37), the processing in the flowchart of FIG. 7 ends.

In step S38, namely, in a case where the color gamut is not covered, the image processing unit 202 displays an alert notification indicating that the color gamut is not covered on the display unit 207.

In the example, as illustrated in FIG. 9, a notification notifying hue having sparse distribution (i.e., insufficient hue) in the color distribution of the input image is displayed. Thereafter, the processing in the flowchart of FIG. 7 ends.

As described above, the information processing apparatus 2 according to the present exemplary embodiment can generate the 3DLUT that enables adjustment of colors with high accuracy even out of the color gamut of the color chart, for example, in the digital camera having a wide color reproduction range.

A modification of the first exemplary embodiment is described. In the first exemplary embodiment, the example in which the color difference calculated by the expression (24) is used as the evaluation value of the pixel values is described. Alternatively, a value $\Delta E_{94}$ (ICE94) represented by the following expression (29) may be used.

$$\Delta E_{94} = \sqrt{[\Delta L^{*2} + \{\Delta C^*/(1+0.045C_1)\}^2 + \{\Delta H^*/(1+0.015C_1)\}^2]} \quad (29)$$

In the expression, $$\Delta L^* = L^*_{Ti} - L^*_{I},$$

$$\Delta C^* = \sqrt{(a^*{}_{Ti}^2 + b^*{}_{Ti}^2)} - \sqrt{(a^*{}_{i}^2 + b^*{}_{i}^2)},$$

$$\Delta H^* = \sqrt{(\Delta E^2 - L^{*2} - \Delta C^{*2})}, \text{ and}$$

$$C_1 = \sqrt{(a^*{}_{Ti}^2 + b^*{}_{Ti}^2)}.$$

A second exemplary embodiment is described. In the first exemplary embodiment, the 3DLUT is designed by using the actually-captured images. In the second exemplary embodiment, an example in which a 3DLUT is generated (redesigned) by using a 3DLUT generated based on a color chart and using actually-captured images obtained by imaging an object in a manner similar to the first exemplary embodiment is described. The configurations of the digital camera 1 and the information processing apparatus 2 according to the second exemplary embodiment are similar to the configurations in FIG. 1 described above. Accordingly, illustrations and descriptions of the configurations are omitted.

Figure 10:
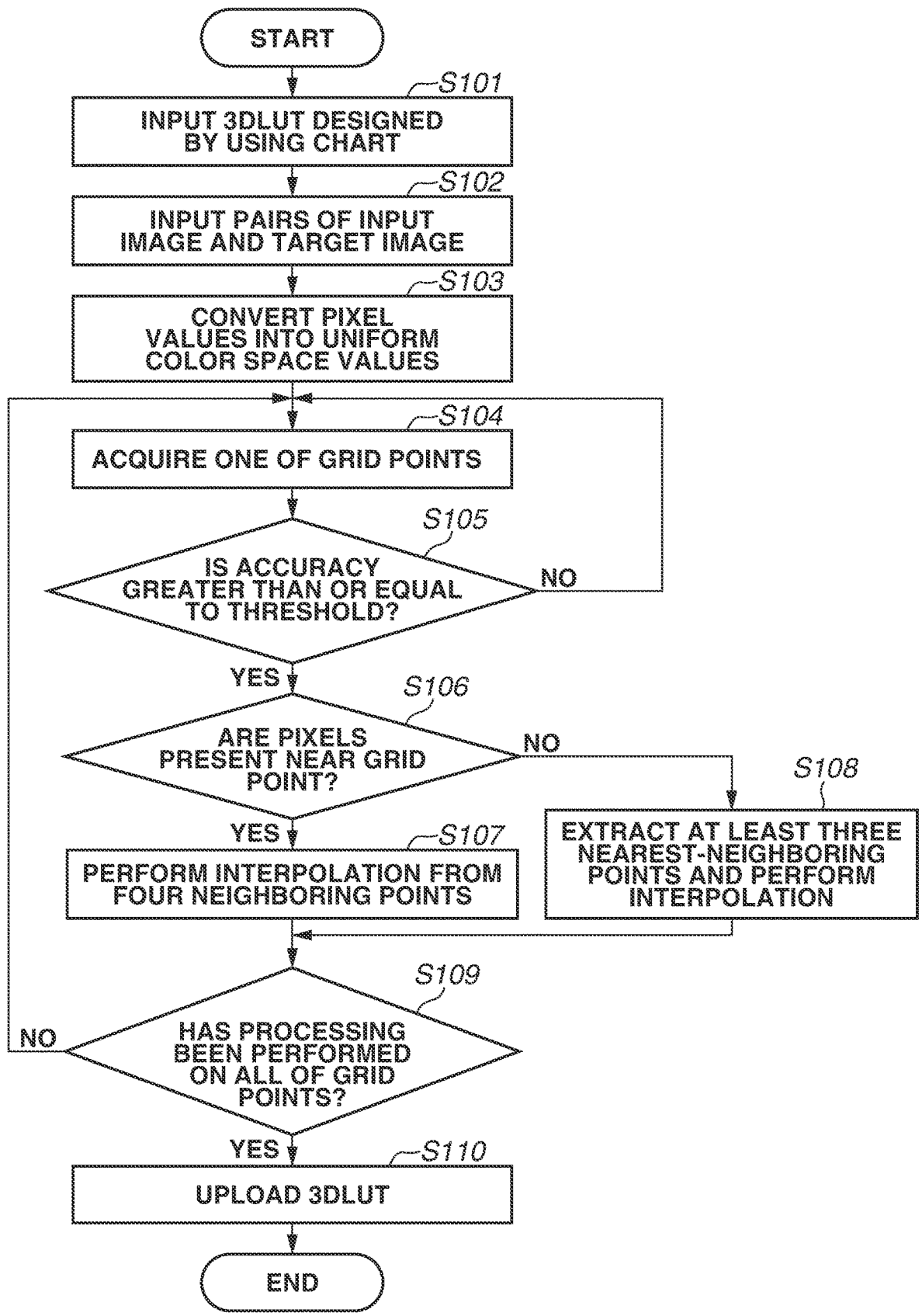
FIG. 10 is a flowchart of 3DLUT generation processing according to a second exemplary embodiment.

The operation of the information processing apparatus 2 according to the second exemplary embodiment is described with reference to FIG. 10. FIG. 10 is a flowchart illustrating a process of 3DLUT generation processing by the information processing apparatus 2 according to the second exemplary embodiment. In the present exemplary embodiment, the image on the first image data is handled as the input image, and the image on the second image data is handled as the target image.

In step S101, the 3DLUT designed based on the color chart is input to the information processing apparatus 2 and is stored in, for example, the holding unit 206. A method of designing the 3DLUT based on the color chart is discussed in, for example, Japanese Patent Application Laid-Open No. 2004-341923. Accordingly, the detailed description of the method is omitted.

In step S102, in a manner similar to the example in the first exemplary embodiment, the input/output unit 201 acquires a plurality of pairs of the input image and the target image, and the plurality of pairs of the input image and the target image is stored in the holding unit 206. In the second exemplary embodiment, the input image and the target image are actually-captured images obtained by imaging the same object other than the color chart as in the first exemplary embodiment.

In step S103, the image processing unit 202 converts RGB values (CIERGB values) of each of pixels of one pair of the input image and the target image among the plurality of pairs acquired and stored in step S102 into uniform color space values (CIELAB values). The processing to convert the CIERGB values into the CIELAB values is similar to the processing described by using the expressions (4) to (12) in the first exemplary embodiment.

In step S104, the image processing unit 202 acquires one of the grid points of the 3DLUT. In the second exemplary embodiment, in a case where it is assumed that the number of grids of the 3DLUT is 17 as in the first exemplary embodiment, the image processing unit 202 acquires RGB values (CIERGB values) corresponding to each of the grid points in order represented by the expression (1) and converts the RGB values into uniform color space values (CIELAB values).

In step S105, the pixel search unit 203 determines an evaluation value representing accuracy of the acquired grid point of the 3DLUT based on the color chart and determines whether to determine interpolation values by interpolation processing for the acquired grid point of the 3DLUT based on the color chart from the accuracy (evaluation value). In the present exemplary embodiment, the pixel search unit 203 searches for a point (uniform color space values) nearest to the uniform color space values of the grid point of interest of the 3DLUT converted in step S104 from the uniform color space values of the pixels of the input image converted in step S103. The pixel search unit 203 searches for a pixel of the target image corresponding to the pixel of the uniform color space values of the input image found as the pixel nearest to the uniform color space values of the grid point of interest of the 3DLUT. The 3DLUT generation unit 205 acquires a difference between the uniform color space values of the found pixel of the input image and the uniform color space values of the pixel of the target image as an accuracy evaluation value of the grid point of interest of the 3DLUT based on the color chart.

In a case where the difference between the uniform color space values of the pixel of the input image nearest to the uniform color space values of the grid point of interest of the 3DLUT and the uniform color space values of the corresponding pixel of the target image is small, it is considered that necessity to determine the interpolation values of the grid point of interest of the 3DLUT is small. In contrast, in a case where the difference between the uniform color space values is large, the interpolation values of the grid point of interest of the 3DLUT are determined. Accordingly, the 3DLUT generation unit 205 compares the accuracy evaluation value that is the difference between the uniform color space values with a threshold.

The threshold at this time is a predetermined value but may be set or changed by the user or the like. In a case where the accuracy evaluation value is less than the threshold (NO in step S105), the processing returns to step S104, and a next unprocessed grid point is acquired. In other words, as the grid point of interest when the accuracy evaluation value is determined to be less than the threshold, the corresponding grid point of the 3DLUT based on the color chart is used as it is. In contrast, in case where the accuracy evaluation value is greater than or equal to the threshold (YES in step S105), the processing proceeds to step S106. Thereafter, the processing to calculate the interpolation values by the interpolation processing is performed on the grid point of interest.

In step S106, the pixel search unit 203 determines whether four pixels (uniform color space values) of the input image surrounding the grid point of interest acquired in step S104 are located. In a case where four pixels (uniform color space values) of the input image surrounding the grid point of interest are located (YES in step S106), the processing proceeds to step S107. In contrast, in a case where four pixels are not located (NO in step S106), the processing proceeds to step S108.

In step S107, the 3DLUT generation unit 205 calculates interpolation values from the four neighboring points in a manner similar to step S6 described above.

In step S108, the 3DLUT generation unit 205 calculates the interpolation values based on the three nearest-neighboring points in a manner similar to step S7 described above.

In step S109 after step S107 or step S108, the 3DLUT generation unit 205 determines whether the calculation processing has been performed on all of the grid points of the 3DLUT.

In a case where the calculation processing has not been performed on all of the grid points (NO in step S109), the processing returns to step S104, and an unprocessed grid point is acquired. In contrast, in a case where the calculation processing has been performed on all of the grid points (YES in step S109), the 3DLUT generation unit 205 generates the 3DLUT by converting the uniform color space values corresponding to each of the grid points into the RGB values. Thereafter, the processing proceeds to step S110.

In step S110, the information processing apparatus 2 stores the generated 3DLUT in the holding unit 206 and uploads the generated 3DLUT to the digital camera 1 through the input/output unit 201. The uploaded 3DLUT is stored in the holding unit 104 of the digital camera 1. In a case where the digital camera 1 performs image processing using the 3DLUT after the upload, color reproduction of an optional input image can be adjusted to color reproduction of the target image.

According to the second exemplary embodiment, the 3DLUT, which is generated by appropriately interpolating the grid points of the 3DLUT based on the color chart based on the pixel values of the input image and the target image, is stored in the digital camera 1. As a result, the digital camera 1 can reproduce colors that cannot be reproduced by the color chart with high accuracy while reproducing colors that can be reproduced by the color chart.

The functions of the information processing apparatus 2 according to each of the above-described first and second exemplary embodiments can be realized by, for example, a computer in an apparatus or a system connected to various kinds of devices and operating the various kinds of devices. In other words, the computer in this case executes program codes of software realizing the information processing according to the exemplary embodiments. Although illustration of a hardware configuration is omitted, the computer realizing the information processing apparatus according to each of the exemplary embodiments includes a central processing unit (CPU), a read only memory (ROM), a random access memory (RAM), an auxiliary storage device, a display unit, an operation unit, a communication interface (I/F), and a bus. The CPU controls the whole of the information processing apparatus by using computer programs and data stored in the ROM and the RAM, and performs the above-described 3DLUT generation processing and the like. The information processing apparatus according to each of the exemplary embodiments may include one or a plurality of pieces of dedicated hardware different from the CPU, and at least a part of the processing by the CPU may be performed by the dedicated hardware. Examples of the dedicated hardware include an application specific integrated circuit (ASIC), a field programmable gate array (FPGA), and a digital signal processor (DSP). The ROM stores programs requiring no change and the like. The RAM temporarily stores programs and data supplied from the auxiliary storage device, data supplied from outside through the communication I/F, and the like. The auxiliary storage device includes a hard disk drive (HDD), and stores various data such as image data and the 3DLUT. The display unit includes a liquid crystal display or a light-emitting diode (LED) display, and displays a GUI for the user to operate the information processing apparatus. The operation unit includes a keyboard, a mouse, a joystick, and a touch panel, and receives operation by the user and inputs various kinds of instructions to the CPU. The CPU also operates as a display control unit controlling the display unit, and an operation control unit controlling the operation unit. The communication I/F is used for communication with an apparatus outside the image processing apparatus. For example, in a case where the information processing apparatus is connected to the external apparatus by a communication cable, the communication cable is connected to the communication I/F. In a case where the information processing apparatus has a function to wirelessly communicate with the external apparatus, the communication I/F includes an antenna. The bus connects the units of the information processing apparatus and transmits information. The display unit and the operation unit are disposed inside the information processing apparatus in the above description. At least one of the display unit and the operation unit may be disposed as a different device outside the information processing apparatus. The information processing apparatus may not include the operation unit.

The disclosure can be realized by supplying programs realizing one or more functions of the above-described exemplary embodiments to a system or an apparatus through a network or a storage medium, and causing one or more processors of a computer in the system or the apparatus to read out and execute the programs. The disclosure can be realized by a circuit (e.g., ASIC) realizing one or more functions.

The above-described exemplary embodiments are merely specific examples for implementation of the disclosure, and the technical scope of the disclosure should not be limitedly interpreted by the above-described exemplary embodiments.

The disclosure can be implemented in various forms without departing from the technical idea or main characteristics thereof.

According to the above-described exemplary embodiments, it is possible to generate the three-dimensional lookup table that enables color reproduction with high accuracy while colors to be reproduced are not limited to colors in the color gamut of the color chart.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-125516, filed Jul. 30, 2021, which is hereby incorporated by reference herein in its entirety.

What is claimed is:

1. An apparatus comprising:
one or more processors; and
at least one memory coupled to the one or more processors storing instructions that, when executed by the one or more processors, cause the one or more processors to function as:
an acquisition unit configured to acquire a pair of first data and second data, the first data being obtained by imaging an object under a first environment, the second data being obtained by imaging the object under a second environment; and
a processing unit configured to determine values corresponding to each of grid points of a three-dimensional lookup table, perform search on whether pixels of the first data are located at positions surrounding a grid point of interest of the three-dimensional look up table and generate the three-dimensional lookup table by using the pair of the first data and the second data, the three-dimensional lookup table holding a condition for image processing to convert the first data into the second data,
wherein, in a case where the pixels of the first data are located at positions surrounding the grid point of interest of the three-dimensional lookup table, the processing unit generates an interpolation point corresponding to the grid point of interest by interpolation processing using the values of the pixels surrounding the grid point of interest,
wherein, in a case where pixels of the first data are not located at the positions surrounding the grid point of interest of the three-dimensional lookup table, the processing unit generates the interpolation point corresponding to the grid point of interest by interpolation processing using values of three neighboring pixels nearest to the grid point of interest, and
wherein the processing unit generates the three-dimensional lookup table holding values of the interpolation point as values of a grid point.

2. The apparatus according to claim 1,
wherein the processing unit searches for the pixels surrounding the grid point of interest by using uniform color space values converted from RGB values of pixels of the first data and the second data and uniform color space values corresponding to the grid point of interest of the three-dimensional lookup table, and
wherein, in the case where pixels of the first data are not located at the positions surrounding the grid point of interest, the processing unit searches for three neighboring pixels nearest to the grid point of interest.

3. The apparatus according to claim 2,
wherein, in the interpolation processing using the values of the pixels surrounding the grid point of interest, the processing unit performs interpolation processing using the uniform color space values of four pixels surrounding the grid point of interest, and
wherein, in the interpolation processing using the values of the three neighboring pixels nearest to the grid point of interest, the processing unit performs interpolation processing using uniform color space values of an imaginary point at which brightness is equal to brightness corresponding to the grid point of interest and hue and saturation are both zero and the uniform color space values of the three nearest-neighboring pixels.

4. The apparatus according to claim 1, wherein the processing unit acquires an evaluation value of the three-dimensional lookup table holding the values of the interpolation point as values of a grid point.

5. The apparatus according to claim 4, wherein the processing unit acquires the evaluation value of the three-dimensional lookup table by comparing data obtained by performing image processing on the first data by using the three-dimensional lookup table holding the values of the interpolation point as values of a grid point, with the second data paired with the first data.

6. The apparatus according to claim 5, wherein the processing unit calculates, as the evaluation value, a color difference between the second data and the data obtained by performing the image processing on the first data by using the three-dimensional lookup table.

7. The apparatus according to claim 4, further comprising a unit configured to notify the evaluation value.

8. The apparatus according to claim 1,
wherein the acquisition unit acquires a plurality of pairs of the first data and the second data, and
wherein the processing unit determines whether the first data covers a predetermined color gamut based on uniform color space values converted from RGB values of pixels of the first data, and in a case where the first data does not cover the predetermined color gamut, the processing unit changes a pair of the first data and the second data.

9. The apparatus according to claim 1, wherein the one or more processors further function as a unit configured to notify hue having sparse distribution in color distribution of the first data.

10. The apparatus according to claim 1, wherein the processing unit acquires a three-dimensional lookup table generated based on a color chart, calculates an evaluation value for each of grid points of the three-dimensional lookup table, and determines whether to generate interpolation values of each of the grid points of the lookup table by interpolation processing based on the evaluation value.

11. The apparatus according to claim 10, wherein the processing unit acquires, as the evaluation value, a difference between uniform color space values converted from RGB values of a pixel of the first data nearest to uniform color space values corresponding to a grid point of interest of the three-dimensional lookup table generated based on the color chart and uniform color space values converted from RGB values of a pixel of the second data corresponding to the pixel of the first data.

12. The apparatus according to claim 11, wherein, in a case where the evaluation value is greater than or equal to a threshold, the processing unit generates interpolation values by the interpolation processing.

13. The apparatus according to claim 12, wherein, in the case where the evaluation value is greater than or equal to the threshold, the processing unit generates an interpolation point corresponding to the grid point of interest by interpolation processing using values of the pixels surrounding the grid point of interest in a case where pixels of the first data are located at the positions surrounding the grid point of interest, and the processing unit generates the interpolation point corresponding to the grid point of interest by interpolation processing using values of three neighboring pixels nearest to the grid point of interest in a case where pixels of the first data are not located at the positions surrounding the grid point of interest.

14. The apparatus according to claim 13, wherein the processing unit searches for the pixels surrounding the grid point of interest by using uniform color space values converted from RGB values of pixels of the first data and the second data and uniform color space values corresponding to the grid point of interest of the three-dimensional lookup table, and in the case where pixels of the first data are not located at the positions surrounding the grid point of interest, the processing unit searches for three neighboring pixels nearest to the grid point of interest.

15. The apparatus according to claim 14,
wherein, in the interpolation processing using the values of the pixels surrounding the grid point of interest, the processing unit performs interpolation processing using the uniform color space values of four pixels surrounding the grid point of interest, and
wherein, in the interpolation processing using the values of the three neighboring pixels nearest to the grid point of interest, the processing unit performs interpolation processing using uniform color space values of an imaginary point at which brightness is equal to brightness corresponding to the grid point of interest and hue and saturation are both zero and the uniform color space values of the three nearest-neighboring pixels.

16. The apparatus according to claim 1, wherein a first apparatus acquiring the first data by imaging the object and a second apparatus acquiring the second data by imaging the object are different from each other.

17. A method performed by an apparatus, the method comprising:
acquiring a pair of first data and second data, the first data being obtained by imaging an object under a first environment, the second data being obtained by imaging the object under a second environment;
determining values corresponding to each of grid points of a three-dimensional lookup table;
performing search on whether pixels of the first data are located at positions surrounding a grid point of interest of the three-dimensional look up table; and
generating the three-dimensional lookup table by using the pair of the first data and the second data, the three-dimensional lookup table holding a condition for image processing to convert the first data into the second data, wherein, in a case where the pixels of the first data are located at positions surrounding the grid point of interest of the three-dimensional lookup table, the generating generates an interpolation point corresponding to the grid point of interest by interpolation processing using the values of the pixels surrounding the grid point of interest, wherein, in a case where pixels of the first data are not located at the positions surrounding the grid point of interest of the three-dimensional lookup table, the generating generates the interpolation point corresponding to the grid point of interest by interpolation processing using values of three neighboring pixels nearest to the grid point of interest, and wherein the generating generates the three-dimensional lookup table holding values of the interpolation point as values of a grid point.

18. A non-transitory computer-readable storage medium that stores a program causing the computer to function, the program comprising:

acquiring a pair of first data and second data, the first data being obtained by imaging an object under a first environment, the second data being obtained by imaging the object under a second environment;

determining values corresponding to each of grid points of a three-dimensional lookup table;

performing search on whether pixels of the first data are located at positions surrounding a grid point of interest of the three-dimensional look up table; and generating the three-dimensional lookup table by using the pair of the first data and the second data, the three-dimensional lookup table holding a condition for image processing to convert the first data into the second data, wherein, in a case where the pixels of the first data are located at positions surrounding the grid point of interest of the three-dimensional lookup table, the generating generates an interpolation point corresponding to the grid point of interest by interpolation processing using the values of the pixels surrounding the grid point of interest, wherein, in a case where pixels of the first data are not located at the positions surrounding the grid point of interest of the three-dimensional lookup table, the generating generates the interpolation point corresponding to the grid point of interest by interpolation processing using values of three neighboring pixels nearest to the grid point of interest, and wherein the generating generates the three-dimensional lookup table holding values of the interpolation point as values of a grid point.

* * * * *